United States Patent
Minato

(10) Patent No.: US 8,975,843 B2
(45) Date of Patent: Mar. 10, 2015

(54) MOTOR CONTROL DEVICE

(75) Inventor: Yoshihiko Minato, Anjo (JP)

(73) Assignee: Aisin Seiki Kabushiki Kaisha, Kariya-shi, Aichi-Ken (JP)

(*) Notice: Subject to any disclaimer, the term of this patent is extended or adjusted under 35 U.S.C. 154(b) by 67 days.

(21) Appl. No.: 13/489,987

(22) Filed: Jun. 6, 2012

(65) Prior Publication Data

US 2012/0308403 A1 Dec. 6, 2012

(30) Foreign Application Priority Data

Jun. 6, 2011 (JP) ................ 2011-126359

(51) Int. Cl.
- H02P 6/16 (2006.01)
- H02P 23/12 (2006.01)
- H02P 6/00 (2006.01)
- H02P 7/00 (2006.01)
- H02P 6/20 (2006.01)
- F04B 15/02 (2006.01)

(Continued)

(52) U.S. Cl.
CPC ............ H02P 6/205 (2013.01); F04B 15/02 (2013.01); F04B 17/03 (2013.01); F04B 49/06 (2013.01); H02P 6/142 (2013.01); H02P 6/18 (2013.01); F04B 2205/10 (2013.01); F04B 2205/11 (2013.01)
USPC ............ 318/400.04; 318/400.14; 318/400.01; 318/400.32; 318/471

(58) Field of Classification Search
CPC ............ H02P 6/06; H02P 6/182; H02P 6/14; H02P 6/16; H02P 6/08
USPC ............ 318/400.04, 400.14, 400.01, 400.32, 318/471
See application file for complete search history.

(56) References Cited

U.S. PATENT DOCUMENTS

| 7,207,173 B2* | 4/2007 | Nakata et al. ............... 60/329 |
| 7,385,366 B2* | 6/2008 | Yukitake ............... 318/400.14 |

(Continued)

FOREIGN PATENT DOCUMENTS

| CN | 101542891 A | 9/2009 |
| JP | 2005-110345 A | 4/2005 |

(Continued)

OTHER PUBLICATIONS

Extended European Search Report dated Dec. 20, 2012, issued by the European Patent Office in the corresponding European Application No. 12169510.0. (5 pages).

(Continued)

*Primary Examiner* — Eduardo Colon Santana
*Assistant Examiner* — Gabriel Agared
(74) *Attorney, Agent, or Firm* — Buchanan Ingersoll & Rooney P.C.

(57) ABSTRACT

A motor control device includes a control condition storage unit storing at least one of a control condition defined by an equivalent voltage supplied to a three-phase motor and a control condition defined by relationship between the equivalent voltage supplied to the three-phase motor and a frequency of PWM signal, a control condition extracting unit extracting the control condition from the control condition storage unit in response to a temperature of a viscous fluid supplied by a pump having the three-phase motor as a power source, and a PWM controlling unit controlling a switching element included in an inverter circuit based on a PWM signal related to the extracted control condition when the three-phase motor is started.

4 Claims, 3 Drawing Sheets

(51) Int. Cl.
*F04B 17/03* (2006.01)
*F04B 49/06* (2006.01)
*H02P 6/14* (2006.01)
*H02P 6/18* (2006.01)

(56) References Cited

U.S. PATENT DOCUMENTS

2006/0150621 A1* 7/2006 Nakata et al. .................... 60/337
2007/0075662 A1   4/2007 Yukitake
2009/0315495 A1  12/2009 Yasui
2011/0084638 A1* 4/2011 Patel et al. ............... 318/400.32

FOREIGN PATENT DOCUMENTS

JP  2005-214216 A  8/2005
JP  2010-017044 A  1/2010

OTHER PUBLICATIONS

Official Action issued by the State Intellectual Property Office of the People's Republic of China on Sep. 19, 2014 in Chinese Application No. 201210183044.3 and English language translation of Official Action (15 Pgs).

* cited by examiner

MOTOR CONTROL DEVICE

CROSS REFERENCE TO RELATED APPLICATIONS

This application is based on and claims priority under 35 U.S.C. §119 to Japanese Patent Application 2011-126359, filed on Jun. 6, 2011, the entire content of which is incorporated herein by reference.

TECHNICAL FIELD

This disclosure generally relates to a motor control device.

BACKGROUND DISCUSSION

Three-phase motors including a stator with stator coils and a rotor with a permanent magnet have been used as a driving source of electric devices. Rotation of the rotor is controlled by controlling attraction force and repulsion force acting between magnetic flux generated when applying current to the stator coils and magnetic flux generated by the permanent magnet. Such control method needs determination of position of the rotor and appropriate current supply to the stator coils depending on a position of the rotor. Although it is possible to use a rotation sensor for detecting accurate position of the rotor, this method leads to a cost increase. Therefore, for detecting the position of the rotor without using the rotation sensor, several technical approaches have been reviewed for example, as disclosed in JP2005-110345A (which will be hereinafter referred to as Patent reference 1).

The Patent reference 1 discloses a control device for activating a sensorless-type motor for driving a hydraulic pump. When hydraulic oil temperature measured by a temperature sensor is higher than a first predetermined temperature, the sensorless-type motor is activated with open-loop control with a first starting commutation frequency, and then, after the speed of rotation reaches a predetermined speed, the sensorless-type motor is controlled by closed-loop control. When hydraulic oil temperature is lower than the first predetermined temperature, the sensorless-type motor is activated and operated with open-loop control with the second starting commutation frequency, which is equal to or less than the first starting commutation frequency.

As described above, the control device disclosed in the Patent reference 1 is intended to activate the sensorless-type motor based on measured temperature of the hydraulic oil. When the hydraulic oil temperature is lower than the predetermined temperature, the commutation frequency is decreased. Since electric power is supplied from an electric generator or a battery to the sensorless-type motor, output voltage may fluctuate. For example, when the output voltage increases, the sensorless-type motor rotates rapidly and may exceed the desired angle of rotation. On the other hand, when the output voltage drops, the speed of rotation of the sensorless-type motor becomes slower and a time period for detecting the position of the sensorless-type motor becomes longer, therefore prolonging a start time.

A need thus exists for a motor control device, which is not susceptible to the drawback mentioned above.

SUMMARY

According to an aspect of this disclosure, a motor control device includes a control condition storage unit storing at least one of a control condition defined by an equivalent voltage supplied to a three-phase motor and a control condition defined by relationship between the equivalent voltage supplied to the three-phase motor and a frequency of PWM signal, a control condition extracting unit extracting the control condition from the control condition storage unit in response to a temperature of a viscous fluid supplied by a pump having the three-phase motor as a power source, and a PWM controlling unit controlling a switching element included in an inverter circuit based on a PWM signal related to the extracted control condition when the three-phase motor is started.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A configuration and an operation of a motor control device according to this disclosure will be described with reference to FIGS. 1 to 4. The motor control device 100 has a function so as to drive a three-phase motor in any temperature of viscous fluid flowed by a pump operated by the three-phase motor. In this disclosure, a sensorless-type brushless three-phase motor including a rotor with permanent magnets and a stator with stator coils is explained as an example. Accordingly, "oil" is used as an example of the "viscous fluid". However, other "viscous fluid" other than "oil" can be applicable.

Figure 1:
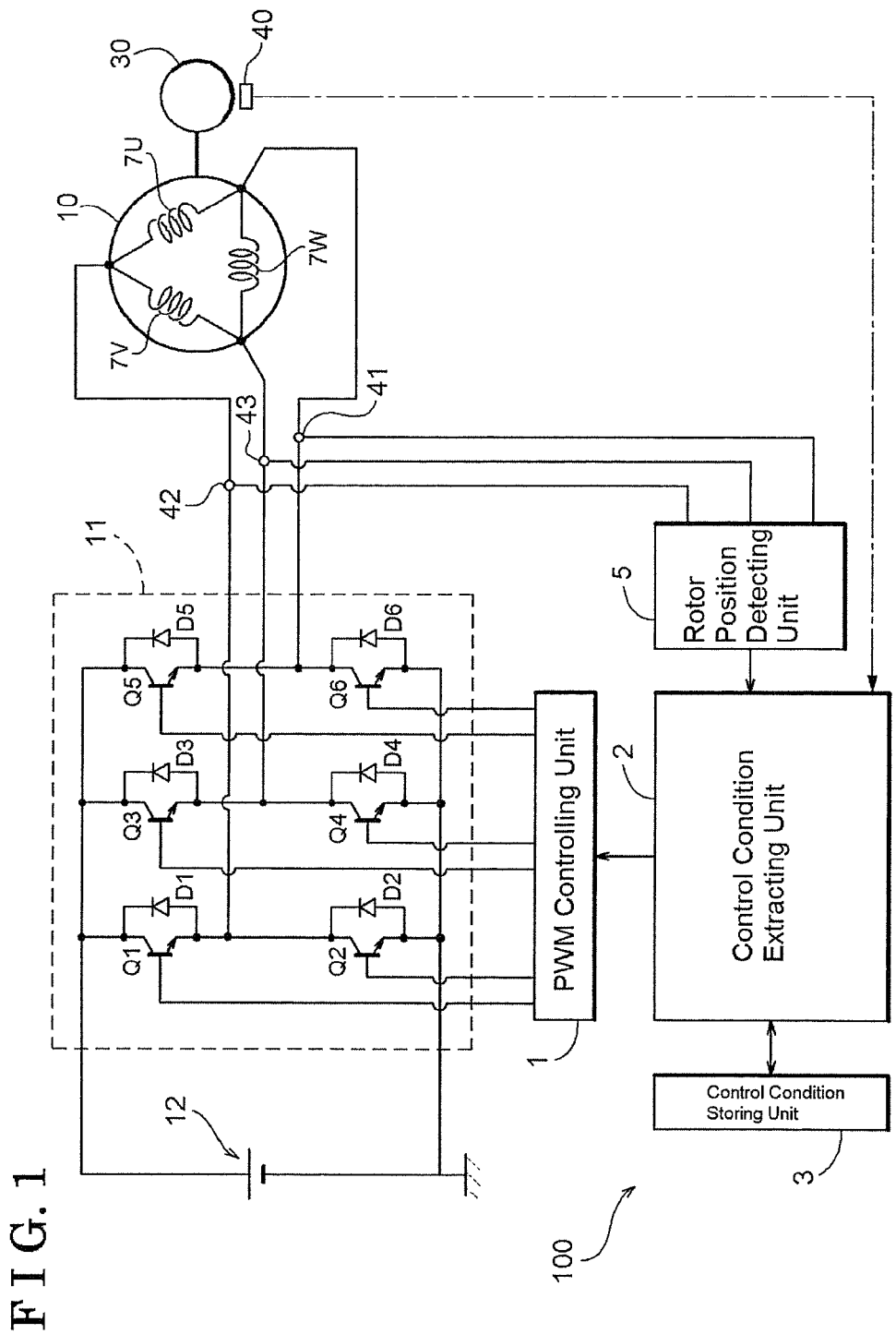
FIG. 1 is a block diagram schematically showing a configuration of a motor control device according to an embodiment disclosed here.

FIG. 1 shows a configuration of the motor control device 100 according to the embodiment. The motor control device 100 includes a pulse-width modulation controlling unit (hereinafter referred to as PWM controlling unit) 1, a control condition extracting unit 2, a control condition storing unit 3, a rotor position detecting unit 5, and an inverter circuit 11.

The three-phase motor 10 includes a rotor with permanent magnets and a stator which generates a magnetic flux for providing rotational force to the rotor. The stator includes three-phase stator coils 7U, 7V and 7W corresponding to U-phase, V-phase and W-phase, respectively. Each stator coil is connected in a delta connection, and is connected to the inverter circuit 11. The three-phase motor 10 is used for driving an oil pump (pump) 30 used for supplying oil.

The inverter circuit 11, which operates the three-phase motor 10 as a controlled object, converts a direct current into an alternate current. Therefore, the inverter circuit 11 serves as a frequency converting unit. The direct current is supplied from an electric power source 12 connected to the inverter circuit 11. The inverter circuit 11 is includes six transistors Q1, Q2, Q3, Q4, Q5 and Q6 including high-side transistors Q1, Q3 and Q5 connected to a positive terminal side of the electric power source 12 and low-side transistors Q2, Q4 and Q6 connected to a negative terminal side of the electric power source 12.

For example, in a case where only the transistor Q1 and the transistor Q4 are turned on at the same time, an electric current is supplied between two terminals of three terminals included in the three-phase motor 10. The three terminals correspond to a U-phase terminal 41, a V-phase terminal 42 and a W-phase terminal 43. When only the transistor Q1 and the transistor Q4 are turned on at the same time, the two terminals correspond to the V-phase terminal 42 and the W-phase terminal 43. Therefore, when only the transistor Q1 and the transistor Q4 are turned on at the same time, the electric current is supplied to between the V-phase terminal 42 and the W-phase terminal 43. In other words, electric current is supplied to the three-phase motor 10 via the transistor Q1, the stator coil 7V and the transistor Q4, and is supplied to the three-phase motor 10 via the transistor Q1, the stator coil 7U, the stator coil 7W and the transistor Q4.

On the other hand, in the case where only the transistor Q3 and the transistor Q2 are turned on at the same instant, the electric current is supplied between the V-phase terminal 42 and the W-phase terminal 43. In this case, the electric current is supplied to the three-phase motor 10 via the transistor Q3, the stator coil 7V and the transistor Q2, and is supplied to the three-phase motor 10 via the transistor Q3, the stator coil 7W, the stator coil 7U and the transistor Q2.

Directions of the electric current through the stator coils 7U, 7V and 7W are different between the case where the transistor Q1 and the transistor Q4 are turned on and the case where the transistor Q3 and the transistor Q2 are turned on. In each of stator coils 7U, 7V and 7W, magnetic flux is generated according to the direction of electric current, and attraction force and repulsion force are generated between the magnetic flux and the permanent magnet included in the rotor. Consequently, by sequentially turning on plural pairs of transistors each pair being constituted by one of the high-side transistors Q1, Q3 and Q5 and one of the low-side transistors Q2, Q4 and Q6, the rotor obtains rotational force.

Each transistors Q1, Q2, Q3, Q4, Q5 and Q6 provides diodes D1, D2, D3, D4, D5 and D6 so that collector terminals of the transistors Q1, Q2, Q3, Q4, Q5 and Q6 are connected to cathode terminals of the diodes D1, D2, D3, D4, D5 and D6 and anode terminals of the diodes D1, D2, D3, D4, D5 and D6 are connected to emitter terminals of the transistors Q1, Q2, Q3, Q4, Q5 and Q6, respectively. Since each of stator coils 7U, 7V and 7W charges energy while each stator coil is electrified, these diodes D1, D2, D3, D4, D5 and D6 are provided to prevent negative effect to peripheral device by counterelectromotive force generated when the power supply to each stator coil is stopped.

The sequence of control applied to such transistors Q1, Q2, Q3, Q4, Q5 and Q6 is conducted by the PWM controlling unit 1. The PWM controlling unit 1 controls switching devices or switching elements included in the inverter circuit 11 with PWM signal having a predetermined frequency. Switching devices included in the inverter circuit 11 corresponds to the transistors Q1, Q2, Q3, Q4, Q5 and Q6 described above. Therefore, the PWM controlling unit 1 operates the transistors Q1, Q2, Q3, Q4, Q5 and Q6 included in the inverter circuit 11.

Figure 2:
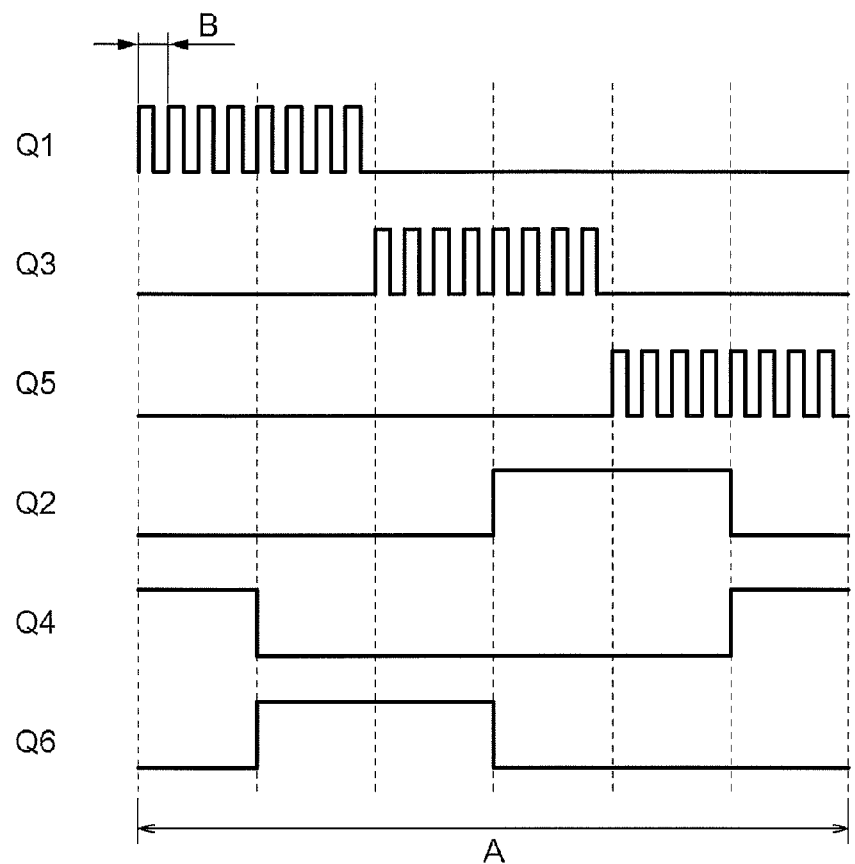
FIG. 2 is a diagram illustrating PWM signals included in one period of signal cycle for respective transistors.

FIG. 2 shows an example of the PWM signal included in one period of signal cycle. In the illustration, the PWM signals for the transistors Q1, Q3, Q5, Q2, Q4 and Q6, respectively are shown. In particular, PWM signals supplied to the transistors Q1, Q3 and Q5 includes plural pulse and electric conduction state (i.e. on and off) via each transistor Q1, Q3, Q5, Q2, Q4 and Q6, are controlled depending on the pulses.

According to FIG. 1, the rotor position detecting unit 5 processes position detection of the rotor based on comparison result between voltage corresponding to counterelectromotive force generated in each stator coil 7U, 7V and 7W and a predetermined reference voltage. In particular, the rotor position detecting unit 5 detects whether or not the position of the rotor reaches the predetermined position. In the detection process, known techniques or common techniques can be applied. Therefore, the explanation of the detection process is omitted in the present specification. The rotor position detecting unit 5 transmits the obtained detection result into the PWM controlling unit 1. The PWM controlling unit 1 processes PWM control based on the detection result transmitted from the rotor position detecting unit 5.

The motor control device 100 outputs the PWM signal based on a temperature of the oil supplied by operation of the oil pump 30. Thus, the position of the three-phase motor 10 can be quickly detected irrespective of the temperature of the oil. Hereinafter, such a start control will be described.

In the present embodiment, a temperature sensor 40 is provided to measure the oil temperature supplied by operation of the oil pump 30. Known devices or common devices can be used for the temperature sensor 40. Measured result of the temperature sensor 40 is transmitted as temperature information into the control condition extracting unit 2 as is explained below.

Figure 3:
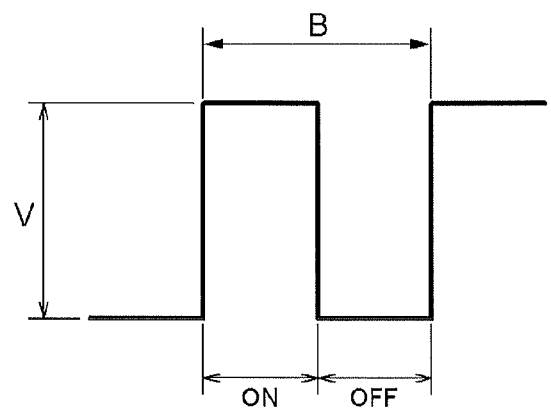
FIG. 3 is a diagram illustrating one cycle of a pulse.

The control condition storing unit 3 stores control conditions defined as relationship between voltage supplied to the three-phase motor 10 and frequency of the PWM signal for controlling the three-phase motor 10. Voltage supplied to the three-phase motor 10 corresponds to output voltage from the inverter circuit 11. As described above in the embodiment, the three-phase motor 10 is operated by PWM control using the PWM signal including plural pulse. FIG. 3 shows a pulse corresponding to one signal cycle of plural pulses included in the PWM signal (for example, the single pulse corresponds to B illustrated in FIG. 2). The pulse amplitude corresponds to the voltage V output from the power source 12. One cyclic period of pluses (B in FIG. 2 and FIG. 3) includes an on-duty state in which the pulse amplitude comes close to the voltage V and an off-duty state in which the pulse amplitude comes close to 0. Therefore, equivalent voltage (or electricity) supplied to the three-phase motor 10 is defined by the voltage V output from the power source 12 and the on-duty.

In concrete, for example, the output voltage of the power source 12 is assumed to be 12 volts. If equivalent voltage supplied to the three-phase motor 10 is 6 volts, the on-duty is set to 50%. Also, if equivalent voltage supplied to the three-phase motor 10 is 4 volts, the on-duty will be set to 33.3%. If equivalent voltage supplied to the three-phase motor 10 is 8 volts, the on-duty is set to 66.6%.

When the equivalent voltage is set to be a higher value, electricity (amount of current) supplied to the stator coil increases and attraction force and repulsion force acting between the stator coil and the permanent magnet becomes stronger. Therefore, the induction voltage becomes higher and starting torque becomes greater. On the other hand, when the equivalent voltage is set to be a lower value, electricity (amount of current) supplied to the stator coil decreases and attraction force and repulsion force acting between the stator coil and the permanent magnet becomes weaker. Therefore, the induction voltage becomes lower and starting torque becomes smaller.

As shown in FIG. 2, the frequency for controlling the three-phase motor 10 includes controlling of transistors Q1, Q2, Q3, Q4, Q5 and Q6 within one period. More specifically, if one period of the PWM signal shown in FIG. 2 corresponds to A, the frequency is 1/A. For example, rotation speed of the rotor increases by increasing the frequency. On the other hand, rotation speed of the rotor decreases by decreasing the frequency.

The PWM signal is thus determined based on the relationship between the equivalent voltage supplied to the three-phase motor 10 and the frequency and is stored in the control condition storing unit 3 in association with the oil temperature. In the present embodiment, the control condition is defined such that the equivalent voltage decreases with increasing the temperature of the viscous fluid (oil). In other words, the control condition is defined such that the equivalent voltage becomes lower as the temperature of the viscous fluid is higher. The frequency decreases with decreasing the temperature of the viscous fluid (oil). In other words, the control condition is defined such that the frequency becomes lower as the temperature of the viscous fluid is lower. The equivalent voltage is determined in association with the duty ratio as described above, the equivalent voltage is defined as the duty ratio.

Figure 4:
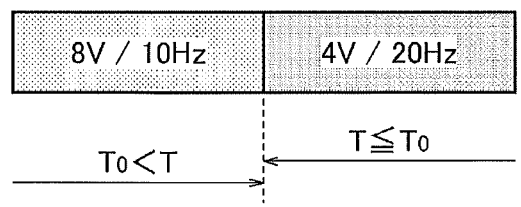
FIG. 4 is a diagram illustrating an example of a control condition.

FIG. 4 shows an example of the control condition stored in the control condition storing unit 3. As shown in FIG. 4, for example, in the case that the oil temperature $T_0$ is greater or equal to T, the stored control condition is "4V/20 Hz", and in the case that the oil temperature $T_0$ is less than T, the stored control condition is "8V/10 Hz". This relationship (dividing the voltage by the frequency) is an example corresponding to relationship between the equivalent voltage supplied to the three-phase motor 10 and the frequency of PWM signal for controlling the three-phase motor 10.

The control condition extracting unit 2 extracts the control condition from the control condition storing unit 3 in response to the temperature of the viscous fluid (oil). The temperature information according to the oil temperature is transmitted from the temperature sensor 40 to the control condition extracting unit 2 as described above. The control condition correlated with the oil temperature is stored in the control condition storing unit 3. Therefore, the control condition extracting unit 2 extracts the control condition related to the oil temperature indicated by the temperature information from the control condition storing unit 3. The extracted control condition is transmitted into the PWM controlling unit 1.

The PWM controlling unit 1 controls transistors Q1, Q2, Q3, Q4, Q5 and Q6 included in the inverter circuit 11 based on the PWM signal corresponding to the extracted control condition when the three-phase motor is started. The extracted control condition is the control condition transmitted from the control condition extracting unit 2. The PWM controlling unit 1 generates the PWM signal defined by such a control condition and controls transistors Q1, Q2, Q3, Q4, Q5 and Q6. Since the PWM signal is a control condition appropriately defined by the oil temperature, the three-phase motor is started in a reliable way. After the three-phase motor is started, the PWM controlling unit 1 controls the rotation of the three-phase motor 10 by generating the PWM signal based on instruction from a control unit serving as upper system.

According to the embodiment, the motor control device 100 generates the PWM signal with the appropriate control condition for starting the three-phase motor 10 in response to the temperature of the viscous fluid. When the PWM signal is predetermined to optimize based on load of the three-phase motor 10, capability of temperature range of the viscous fluid can be expanded. Position of the three-phase motor 10 can be quickly detected within the expanded temperature range.

Other Embodiments

The above embodiment discloses that the control condition storing unit 3 stores the control condition defined by relationship between the equivalent voltage supplied to the three-phase motor 10 and the frequency of PWM signal for controlling the three-phase motor 10. However, a scope of the specification related to present disclosure is not limited to the particular embodiment disclosed herein. The control condition storing unit 3 may provide only the control condition defined by the equivalent voltage supplied to the three-phase motor 10. In other words, frequency of the PWM signal may be kept at constant value regardless of the oil temperature.

In addition, the control condition storing unit 3 may store both the control condition defined by the equivalent voltage supplied to the three-phase motor 10 and the control condition defined by relationship between the equivalent voltage supplied to the three-phase motor 10 and the frequency of the PWM signal for controlling the three-phase motor 10. According to this case, the control condition extracting unit 2 may extract appropriate control condition selected from the control condition defined by the equivalent voltage supplied to the three-phase motor 10 and the control condition defined by relationship between the equivalent voltage supplied to the three-phase motor 10 and the frequency of PWM signal for controlling the three-phase motor 10 in accordance with the oil temperature.

The above embodiment discloses that the control condition is defined such that the equivalent voltage becomes lower as the oil temperature is higher and the frequency becomes lower as the oil temperature is lower. However, the scope of the specification related to present disclosure is not limited to the particular embodiment disclosed herein. The control condition may be defined such that the equivalent voltage becomes lower as the oil temperature is higher and the frequency is kept at the constant value.

The above embodiment discloses that the control condition storing unit 3 stores the control condition "4V/20 Hz" when the oil temperature $T_0$ is greater or equal to T, and the control condition "8V/10 Hz" when the oil temperature $T_0$ is less than T. However, the scope of the specification related to present disclosure is not limited to the particular embodiment disclosed herein. The control condition storing unit 3 may store three classifications defining in response to the oil temperature.

Figure 5:
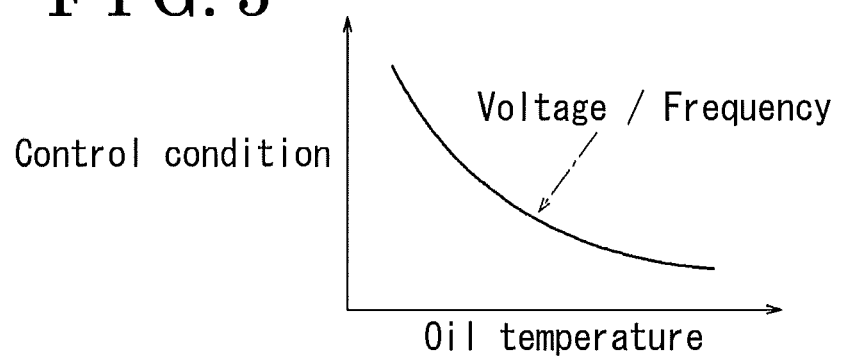
FIG. 5 is a diagram illustrating an example of characteristic curve of the control condition.

In addition, as shown in FIG. 5 as an example, the control condition storing unit 3 may store a characteristic curve corresponding to the relationship between the oil temperature (vertical axis) and the control condition (horizontal axis) such as the equivalent voltage. Also, the control condition storing unit 3 may store three dimensional map corresponding to the relationship between the oil temperature (X axis), the equivalent voltage (Y axis) and the frequency (Z axis).

The disclosure can be applied for the motor control device which rapidly starts the motor.

According to the construction of the embodiment, a motor control device 100 includes a control condition storage unit 3 storing at least one of a control condition defined by an equivalent voltage supplied to a three-phase motor 10 and a control condition defined by relationship between the equivalent voltage supplied to the three-phase motor 10 and a frequency of PWM signal, a control condition extracting unit extracting the control condition from the control condition storage unit 2 in response to a temperature of a viscous fluid supplied by a pump 30 having the three-phase motor 10 as a power source, and a PWM controlling unit 1 controlling a switching element Q1, Q2, Q3, Q4, Q5 and Q6 included in an inverter circuit 11 based on a PWM signal related to the extracted control condition when the three-phase motor 10 is started.

According to the above described structure, the motor control device 100 generates the PWM signal with the appropriate control condition for starting the three-phase motor 10 in response to the temperature of the viscous fluid. When the PWM signal is predetermined to optimize based on load of the three-phase motor 10, capability of temperature range of the viscous fluid can be expanded. Position of the three-phase motor 10 can be quickly detected within the expanded temperature range.

According to the construction of the embodiment, the control condition is defined such that the equivalent voltage becomes lower as the temperature of the viscous fluid is higher.

Since viscosity of the viscous fluid is low when the temperature of the viscous fluid is high, the load of the three-phase motor 10 is light. According to the above described structure, the output torque of the three-phase motor 10 may be decreased. Therefore, the position of the three-phase motor 10 may be rapidly detected even when the load applied to the three-phase motor 10 is light.

According to the construction of the embodiment, the equivalent voltage is defined as a duty ratio.

According to the above described structure, the equivalent voltage may be appropriately defined by defining the duty ratio for starting the three-phase motor 10 rapidly. Therefore, the three-phase motor 10 may be rapidly started regardless of the temperature of the viscous fluid.

According to the construction of the embodiment, the control condition is defined such that the frequency becomes lower as the temperature of the viscous fluid is lower.

Since viscosity of the viscous fluid is high when the temperature of the viscous fluid is low, the load of the three-phase motor 10 is heavy. According to the above described structure, output torque of the three-phase motor 10 may be increased. Therefore the position of the three-phase motor 10 may be rapidly detected even when load applied to the three-phase motor 10 is heavy.

According to the construction of the embodiment, a motor control device 100 for controlling rotational driving of a three-phase motor 10 includes a control condition storage unit 3 storing plural control condition that relates to a pulse of a voltage applied to the three phase motor 10 by controlling plural switching element Q1, Q2, Q3, Q4, Q5 and Q6 when the voltage supplied from a power source 12 is applied to the three-phase motor 10, a PWM controlling unit 1 controlling plural switching element based on the control condition from the control condition storage unit 3, and a control condition extracting unit 2 extracting one of the control conditions from the control condition storage unit 3 in response to a temperature of a viscous fluid intended to flow by a pump 30 using the three-phase motor 10 as a power source.

According to the above described structure, the three-phase motor 10 may be appropriately controlled in response to the temperature of the viscous fluid. Therefore, since the three phase motor 10 is controlled with the right condition to load of the three-phase motor 10, capability of temperature range of the viscous fluid can be expanded. Position of the three-phase motor 10 can be quickly detected within the expanded temperature range.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A motor control device, comprising:
    a control condition storage unit storing at least one of a control condition defined by an equivalent voltage supplied to a three-phase motor and a control condition defined by relationship between the equivalent voltage supplied to the three-phase motor and a frequency of PWM signal;
    a control condition extracting unit extracting the control condition from the control condition storage unit in response to a temperature of a viscous fluid supplied by a pump having the three-phase motor as a power source;
    a PWM controlling unit controlling a switching element included in an inverter circuit based on a PWM signal related to the extracted control condition when the three-phase motor is started; and
    wherein the control condition is defined such that the equivalent voltage becomes lower as the temperature of the viscous fluid is higher, the equivalent voltage being defined by a voltage and a duty ratio of the PWM signal, the voltage corresponding to a pulse amplitude of the PWM signal.

2. A motor control device according to claim 1, wherein the control condition is defined such that the frequency becomes lower as the temperature of the viscous fluid is lower.

3. A motor control device for controlling rotational driving of a three-phase motor, comprising:
    a control condition storage unit storing a plurality of control conditions that relates to a pulse of a voltage applied to the three phase motor by controlling a plurality of switching elements when the voltage supplied from a power source is applied to the three-phase motor;
    a PWM controlling unit controlling the plurality of switching elements based on one of the plurality of conditions from the control condition storage unit; and
    a control condition extracting unit extracting the one of the control conditions from the control condition storage unit in response to a temperature of a viscous fluid intended to flow by a pump using the three-phase motor as a power source, the one of the control conditions defined such that an equivalent voltage becomes lower as the temperature of the viscous fluid is higher, the equivalent voltage being defined by the voltage applied to the three phase motor and a duty ratio of a PWM signal, the voltage corresponding to an amplitude of the pulse of the PWM signal.

4. A motor control device for controlling a three-phase motor that drives a pump, comprising:
    a control condition storage unit storing at least one of a first control condition defined by an equivalent voltage supplied to the three-phase motor, and a second control condition defined by a relationship between the equivalent voltage supplied to the three-phase motor and a frequency of a PWM signal, the equivalent voltage being defined by a voltage and a duty ratio of the PWM signal, the voltage corresponding to a pulse amplitude of the PWM signal;
    a control condition extracting unit which receives temperature information about a viscous fluid supplied by the pump driven by the three-phase motor and which extracts one of the first and second control conditions from the control condition storage unit in response to the temperature information; and a PWM controlling unit controlling a switching element included in an inverter circuit based on the PWM signal related to the extracted control condition when the three-phase motor is started.

* * * * *